(12) United States Patent
Oku

(10) Patent No.: US 12,072,497 B2
(45) Date of Patent: Aug. 27, 2024

(54) IMAGE DISPLAY APPARATUS AND IMAGE DISPLAY METHOD

(71) Applicant: SONY GROUP CORPORATION, Tokyo (JP)

(72) Inventor: Takashi Oku, Tokyo (JP)

(73) Assignee: SONY GROUP CORPORATION

( * ) Notice: Subject to any disclaimer, the term of this patent is extended or adjusted under 35 U.S.C. 154(b) by 0 days.

(21) Appl. No.: 18/001,698

(22) PCT Filed: May 12, 2021

(86) PCT No.: PCT/JP2021/018072
§ 371 (c)(1),
(2) Date: Dec. 13, 2022

(87) PCT Pub. No.: WO2021/261100
PCT Pub. Date: Dec. 30, 2021

(65) Prior Publication Data
US 2023/0221559 A1    Jul. 13, 2023

(30) Foreign Application Priority Data
Jun. 22, 2020  (JP) ................ 2020-106965

(51) Int. Cl.
*G02B 27/01* (2006.01)
*G02B 27/00* (2006.01)
*G09G 3/00* (2006.01)

(52) U.S. Cl.
CPC ..... *G02B 27/0172* (2013.01); *G02B 27/0093* (2013.01); *G02B 27/0179* (2013.01);
(Continued)

(58) Field of Classification Search
CPC ............... G09G 3/003; G02B 27/0172; G02B 27/0093; G02B 27/0179; G02B 2027/0138; G02B 2027/014; G02B 2027/0187
See application file for complete search history.

(56) References Cited

U.S. PATENT DOCUMENTS

| 10,417,784 B1 | 9/2019 | Cavin et al. |
| 2015/0198808 A1 | 7/2015 | Morifuji et al. |

(Continued)

FOREIGN PATENT DOCUMENTS

| JP | H08-154898 | 6/1996 |
| JP | 2017-009986 | 1/2017 |

(Continued)

OTHER PUBLICATIONS

International Search Report and Written Opinion prepared by the Japan Patent Office on Jul. 9, 2021, for International Application No. PCT/JP2021/018072, 2 pgs.

*Primary Examiner* — Robert J Michaud
(74) *Attorney, Agent, or Firm* — SHERIDAN ROSS P.C.

(57) ABSTRACT

An image display apparatus that makes it possible to improve the tracking accuracy, while making the image display apparatus smaller in size. An image display apparatus includes a light source section that emits image display light OL used to display an image, and light CL conjugate to the image display light OL; an optical system that projects the image display light OL emitted by the light source section onto a pupil of an eye of a user, and projects the conjugate light CL emitted by the light source section onto a portion around the pupil of the eye of the user; a detector that detects reflected light that corresponds to the conjugate light CL projected by the optical system to be reflected off the portion around the pupil; and a controller that controls a
(Continued)

position of a display-target image on the basis of the reflected light detected by the detector.

15 Claims, 16 Drawing Sheets

(52) U.S. Cl.
CPC ..... *G09G 3/003* (2013.01); *G02B 2027/0138* (2013.01); *G02B 2027/014* (2013.01); *G02B 2027/0187* (2013.01)

(56) References Cited

U.S. PATENT DOCUMENTS

| | | | |
|---|---|---|---|
| 2016/0033771 A1* | 2/2016 | Tremblay | G02B 26/10 359/851 |
| 2019/0191994 A1 | 6/2019 | Yamamoto et al. | |
| 2020/0093363 A1* | 3/2020 | Saika | A61B 3/107 |

FOREIGN PATENT DOCUMENTS

| WO | WO 2014/017348 | 1/2014 |
|---|---|---|
| WO | WO 2017/203815 | 11/2017 |

\* cited by examiner

IMAGE DISPLAY APPARATUS AND IMAGE DISPLAY METHOD

CROSS REFERENCE TO RELATED APPLICATIONS

This application is a national stage application under 35 U.S.C. 371 and claims the benefit of PCT Application No. PCT/JP2021/018072, having an international filing date of 12 May 2021, which designated the United States, which PCT application claimed the benefit of Japanese Patent Application No. 2020-106965, filed 22 Jun. 2020, the entire disclosures of each of which are incorporated herein by reference.

TECHNICAL FIELD

The present technology relates to an image display apparatus and an image display method, and in particular to an image display apparatus that displays an image in a holographical way, and an image display method using the image display apparatus.

BACKGROUND ART

In recent years, an image display apparatus (eyewear) such as a head-mounted display (HMD) that is used to display an image to a user by being worn on the body such as the face of the user.

When eye tracking (line-of-sight tracking) is performed using such eyewear, there is generally a need for an illumination system other than video light, and thus, usually, it is often the case that illumination using infrared light is arranged. Further, it is often the case that the illumination is arranged around a frame, and this results in making the eyewear itself larger in size.

Further, in transmissive eyewear, the frame of the eyewear causes a reduction in a sense of immersion when an image is superimposed, and thus it is necessary that the view of a user not be obstructed. However, a frame width tends to become larger since illumination using infrared light is arranged. This results in a reduction in a sense of immersion.

Furthermore, when a desired pattern is generated to perform irradiation onto an eyeball, there is a need for a further additional optical system. Consequently, the entirety of eyewear tends to be made larger in size.

Thus, in view of the circumstances described above, a technology that makes it possible to make eyewear smaller in size has been proposed in the past.

For example, Patent Literature 1 proposes an image projection apparatus that includes a light source that emits an image light beam that forms an image, and a checking light beam; an optical system that projects the image light beam emitted from the light source onto a first surface region of an eye of a user to project the image light beam onto a retina of the user, and projects the checking light beam emitted from the light source onto a second surface region of the eye of the user, the second surface region being distant from the first surface region; a light detector that detects reflected light that corresponds to the checking light beam reflected off the eye of the user; and a controller that controls at least one of the light source or the optical system on the basis of a result of the detection of the reflected light that is performed by the light detector.

CITATION LIST

Patent Literature

Patent Literature 1: Japanese Patent Application Laid-open No. 2017-009986

DISCLOSURE OF INVENTION

Technical Problem

However, Patent Literature 1 does not propose, using the technology disclosed in Patent Literature 1, any solutions to make the image display apparatus smaller in size and to improve the tracking accuracy. Thus, there are demands for further development of an image display apparatus that solves those issues at the same time.

Thus, it is a primary object of the present technology to provide an image display apparatus that makes it possible to improve the tracking accuracy, while making the image display apparatus smaller in size.

Solution to Problem

The present technology provides an image display apparatus that includes a light source section that emits image display light used to display an image, and light conjugate to the image display light; an optical system that projects the image display light emitted by the light source section onto a pupil of an eye of a user, and projects the conjugate light emitted by the light source section onto a portion around the pupil of the eye of the user; a detector that detects reflected light that corresponds to the conjugate light projected by the optical system to be reflected off the portion around the pupil; and a controller that controls a position of a display-target image on the basis of the reflected light detected by the detector.

Further, the present technology provides an image display method that includes emitting image display light used to display an image, and light conjugate to the image display light; projecting the emitted image display light and the emitted conjugate light respectively onto a pupil of an eye of a user and a portion around the pupil of the eye of the user; detecting reflected light that corresponds to the projected conjugate light reflected off the portion around the pupil; and controlling a position of a display-target image on the basis of the detected reflected light.

Advantageous Effects of Invention

The present technology makes it possible to provide an image display apparatus that makes it possible to make the image display apparatus smaller and to improve the tracking accuracy. Note that the effects described above are not necessarily limitative, and any effect described herein or other effects that could be understood herein may be provided in addition to, or instead of the effects described above.

MODE(S) FOR CARRYING OUT THE INVENTION

Favorable embodiments for carrying out the present technology will now be described below with reference to the drawings. Embodiments described below are examples of representative embodiments of the present technology, and any combination of the embodiments may be adopted. Further, the scope of the present technology is not construed as being limited to the embodiments. Note that the description is made in the following order.

1. First Embodiment
   (1) Example of Configuration of Image Display Apparatus
   (2) Example of Configuration of Controller
   (3) Example of Image Display Method (Tracking Method)
   (4) Modifications
2. Second Embodiment
3. Third Embodiment
   (1) Example of Configuration of Image Display Apparatus
   (2) Example of Captured Image
4. Fourth Embodiment
5. Fifth Embodiment
6. Sixth Embodiment
7. Other Use Applications

1. First Embodiment

(1) Example of Configuration of Image Display Apparatus

Figure 1:
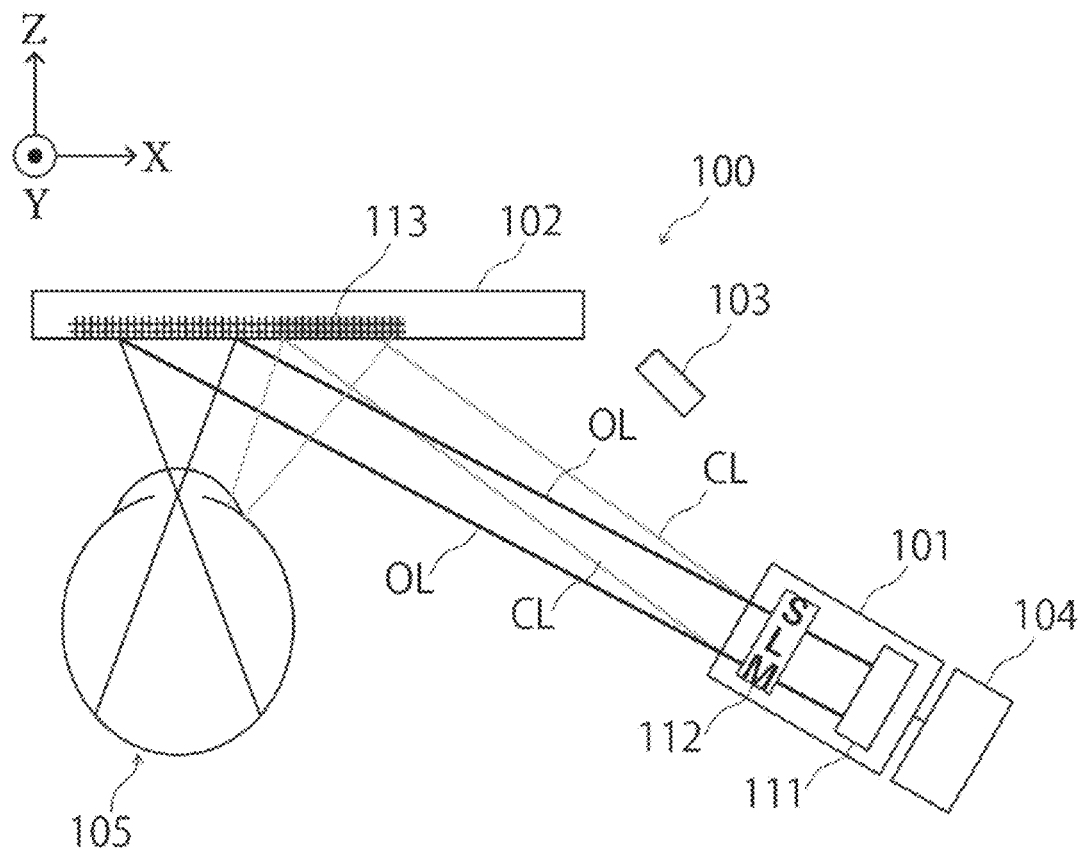
FIG. 1 is a plan view of an image display apparatus according to a first embodiment of the present technology as viewed from above.
Figure 2:
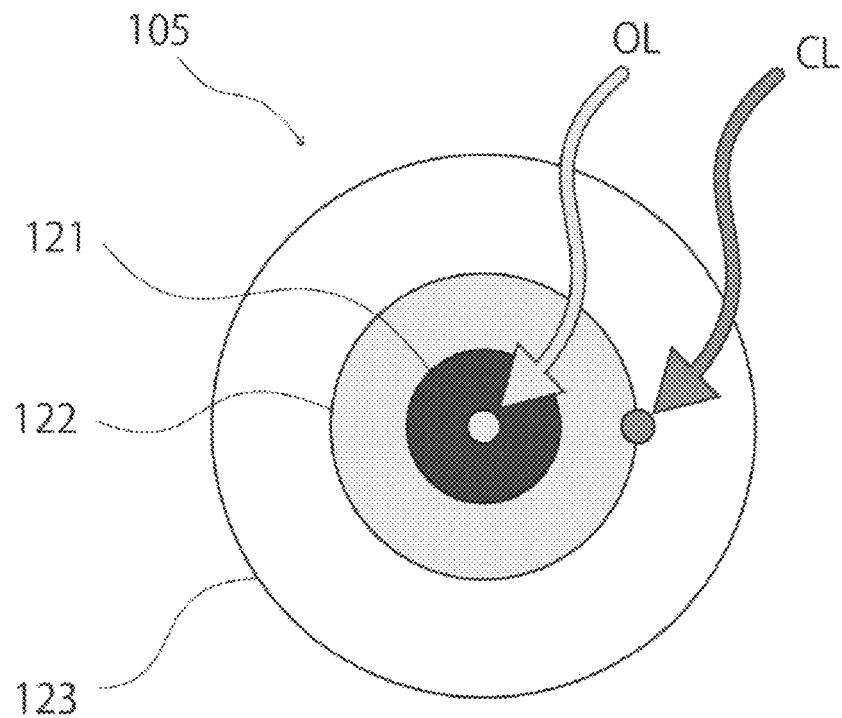
FIG. 2 schematically illustrates an example of a captured image captured using the image display apparatus according to the first embodiment of the present technology.

First, an example of a configuration of an image display apparatus according to a first embodiment of the present technology is described with reference to FIGS. 1 and 2. FIG. 1 is a plan view illustrating an example of a configuration of an image display apparatus 100 according to the present embodiment as viewed from above. FIG. 2 schematically illustrates an example of a captured image of an eyeball 105 that is captured from the front of the eyeball 105 using the image display apparatus 100.

For example, the image display apparatus 100 can be used in the form of a holographic wavefront-reconstruction eyewear display that irradiates light onto a hologram and uses diffraction performed due to interference fringes recorded in the hologram to generate the same wavefront as object light that corresponds to an original signal wave. Note that the image display apparatus 100 can be applied to an off-axis optical system that primarily deals with augmented reality (AR).

As illustrated in FIG. 1, the image display apparatus 100 includes, for example, an optical section 101 that is an optical engine that reconstructs a wavefront, a combiner 102 that is a light concentration section that changes directions of light beams of, for example, image display light OL and conjugate light CL, and concentrates the light beams on an eye of a user to guide the light beams to a pupil of the eye of the user, an imaging section 103 that is a detector that acquires data of a positional relationship between an eyeball and a light beam, and a controller 104 that, for example, generates an image and adjusts a position of an image.

In the image display apparatus 100, the optical section 101 and the combiner 102 form an optical system. It can also be said that the optical system is the optical section 101 from which a light source section described later is excluded, and the combiner 102. The optical system serves to project the conjugate light CL emitted by the light source section onto a portion around a pupil of an eye of a user. The combiner 102 includes an optical element 113 off which the conjugate light CL is reflected, and a diffractive optical element (DOE) is used as the optical element 113.

The imaging section 103 is included in the detector detecting reflected light that corresponds to the conjugate light CL projected by the optical system to be reflected off the portion around the pupil. The imaging section 103 captures an image of reflected light of an image-formation image in which the image display light OL is incident on the pupil to be imaged onto a retina, and a reflection image in which the conjugate light CL is reflected off the portion around the pupil. Note that the imaging section 103 can acquire information regarding the image display light OL and the conjugate light CL not only from a single eye but also from two eyes.

The optical section 101 includes a light source section 111 in which a (partially) coherent light source including, for example, a semiconductor laser (LD), a superluminescent diode (SLD), or a light-emitting diode (LED) is generated, and a spatial light phase modulator (SLM) 112 that is a modulator that spatially modulates amplitudes or phases of the image display light OL and the conjugate light CL. The optical section 101 generates the image display light (object light) OL used to display an image of an object, and the conjugate light CL conjugate to the image display light OL. Here, the conjugate light refers to light in which an angle formed by the light and corresponding image display light is secured. Specific examples of the optical section 101 include a lens, and an optical component, such as a holographic optical element (HOE), a diffractive optical element (DOE), a meta-surface, or a metamaterial, that includes a lens function.

The image display light OL emitted by the light source section 111 of the optical section 101, and the conjugate light CL conjugate to the image display light OL are displayed on a computer-generated hologram (CGH) situated on the SLM 112. Here, the image display light OL and the conjugate light CL are conjugate to each other, and thus an angular relationship between the image display light OL and the conjugate light CL is secured. The image display light OL and the conjugate light CL conjugate to the image display light OL enter the combiner 102, a wavefront obtained by the light reflected off each optical element situated on the combiner is generated, and reproduced image display light OL is incident on the eyeball 105 of a user. The image display light OL incident on the eyeball 105 is incident on a pupil to be imaged onto a retina.

In FIG. 1, a depth direction that is a direction of a line of sight of the eyeball 105 of a user is referred to as a Z direction (an up-and-down direction as viewed from the surface of the sheet of the figure), and directions that are orthogonal to each other in a plane vertical to the Z direction are referred to as an X direction (a right-and-left direction as viewed from the surface of the sheet of the figure) and a Y direction (a front-and-back direction as viewed from the surface of the sheet of the figure).

FIG. 2 schematically illustrates an example of a captured image captured using the image display apparatus 100. As illustrated in FIG. 2, the image display light OL is incident on a retina from a pupil 121 of the eyeball 105. On the other hand, the conjugate light CL is incident on a portion around the pupil 121 of the eyeball 105, such as a boundary of an iris 122 and a sclera 123. Here, the portion around the pupil 121 refers to the iris 122, the sclera 123, a boundary of the pupil 121 and the iris 122, and the boundary of the iris 122 and the sclera 123. Note that the projection of the conjugate light CL onto the boundary of the iris 122 and the sclera 123 makes it possible to more easily determine a position of the image display light OL.

In FIG. 2, the depth direction that is the direction of the line of sight of the eyeball 105 of the user is referred to as the Z direction (a front-and-back direction as viewed from the surface of the sheet of the figure), and the directions orthogonal to each other in the plane vertical to the Z direction are referred to as the X direction (a right-and-left direction as viewed from the surface of the sheet of the figure) and the Y direction (an up-and-down direction as viewed from the surface of the sheet of the figure).

Figure 3:
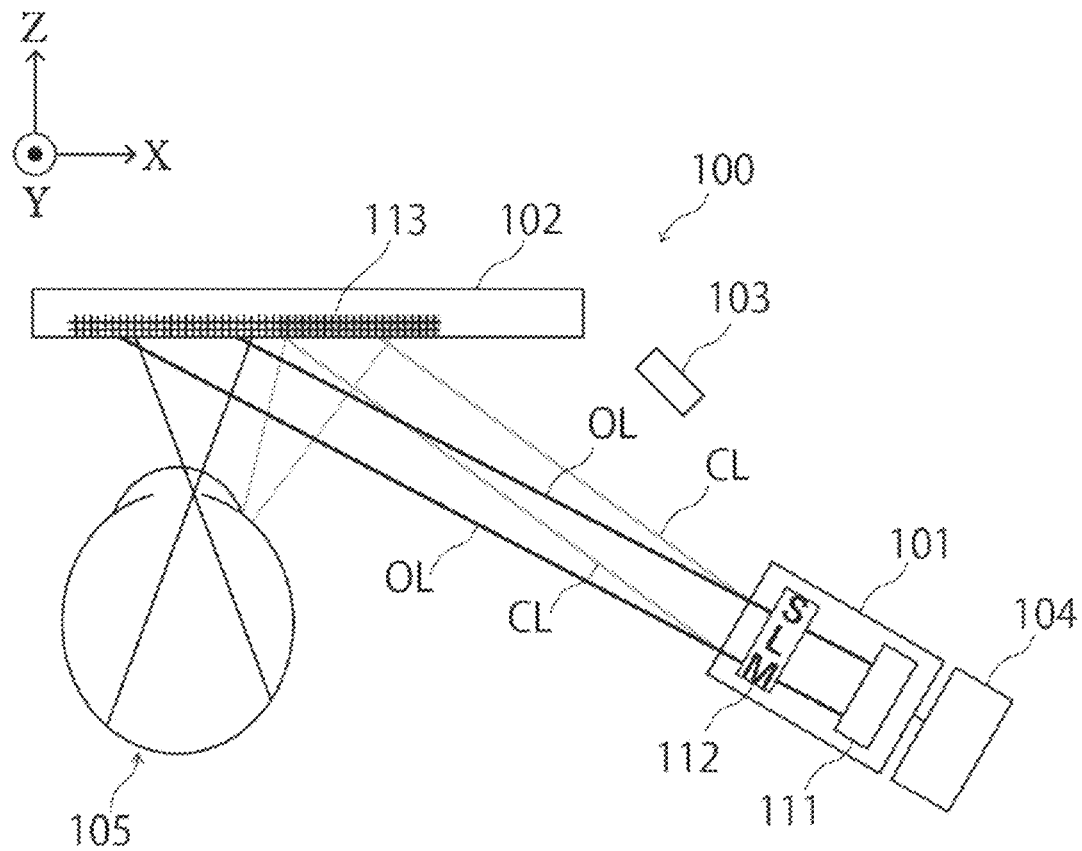
FIG. 3 is a plan view of the image display apparatus according to the first embodiment of the present technology as viewed from above.
Figure 4:
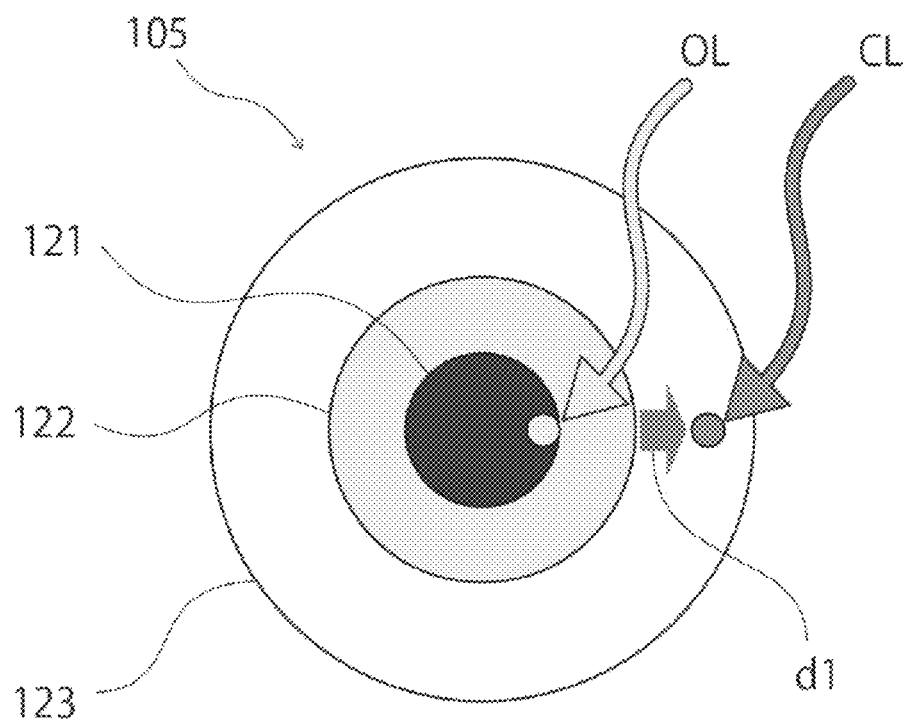
FIG. 4 schematically illustrates an example of a captured image captured using the image display apparatus according to the first embodiment of the present technology.

Next, an overview of eye tracking performed using the image display apparatus 100 is described with reference to FIGS. 1 to 4. FIG. 3 is a plan view illustrating an example of the configuration of the image display apparatus 100 when a shifted image is incident on the pupil, as viewed from above. FIG. 4 schematically illustrates an example of a captured image captured when the shifted image is incident on the pupil.

As illustrated in FIG. 3, when the incident image display light OL deviates from the center of the pupil 121 (an initial reference position), the conjugate light CL also deviates by the same deviation amount to be incident on the portion around the pupil 121. Specifically, for example, as illustrated in FIG. 4, when the image display light OL deviates rightward from the center of the pupil 121 by a deviation amount d1 as viewed from the surface of the sheet of FIG. 4, the conjugate light CL also deviates rightward by the deviation amount d1 as viewed from the surface of the sheet of FIG. 4 to be incident on the sclera 123.

Here, the image display light OL incident on the eyeball 105 deviates from the center of the pupil 121 by the deviation amount d1 to be incident on the pupil, and is imaged onto the retina. On the other hand, the conjugate light CL is reflected off a portion on the sclera 123 that is situated at a position offset by the deviation amount d1. Thus, an image of the reflected conjugate light CL is captured using the imaging section 103. The captured image captured using the imaging section 103 is acquired by the controller 104, the controller 104 computes an amount to be shifted with respect to the deviation amount d1 and a correction amount, and feedback is given to the controller 104 again.

As a correction method, there are also a method that changes a phase pattern that is caused to overlap the SLM 112 in the optical section 101 upon generating a wavefront, and a method that additionally inserts a steering element that is a dynamic optical element (such as a MEMS mirror or a liquid prism).

The shift from an initial reference position in plane with a screen in the up-and-down direction and the right-and-left direction (an XY direction) can be obtained by observing a position of a Fourier image of the conjugate light CL on the eyeball 105 and by computing the shift from the initial reference position. Further, the shift in the depth direction (the Z direction) that is the direction of the line of sight of the eyeball 105 can be determined using a defocusing amount that is an amount by which the Fourier image of the conjugate light CL is shifted in an optical-axis direction from a focusing position.

(2) Example of Configuration of Controller

Figure 5:
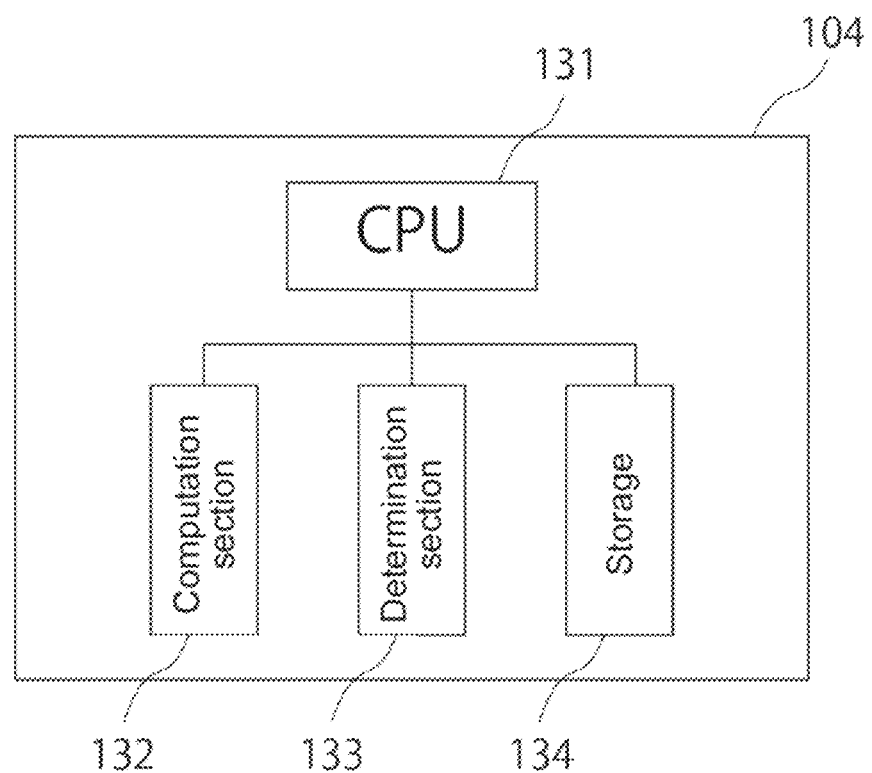
FIG. 5 is a block diagram illustrating an example of a configuration of a controller according to the first embodiment of the present technology.

Next, an example of a configuration of a controller according to the present embodiment is described with reference to FIG. 5. FIG. 5 is a block diagram illustrating an example of a configuration of the controller 104 of the image display apparatus 100. The controller 104 stores therein data of an initial reference position in addition to generation of an image and adjustment of a position of an image. Further, the controller 104 also performs computation using image data to, for example, obtain a position of an image and predict the position of the image.

Here, when, for example, a head-mounted display (HMD) is used, the initial reference position is set to be a position at which a video can be viewed, on the basis of a position of the head of a user when the HMD is worn on the head of the user. Examples of a method for setting the initial reference position include a mechanical method that uses, for example, a VR headset, and other methods such as an electrical method using, for example, an electrical drive mirror. Note that, in order to secure a range to accommodate the deviation after the initial position is set, an SLM is not used from the beginning.

As illustrated in FIG. 5, the controller 104 includes, for example, a central processing unit (CPU) 131, a computation section 132, a determination section 133, and a storage 134. The CPU 131 is connected to each of the computation section 132, the determination section 133, and the storage 134, and controls instructions given by the respective components.

The computation section 132 computes an amount of deviation of and an amount of correction for the conjugate light CL. The determination section 133 determines whether the amount of deviation of the conjugate light CL is in an acceptable range. The storage 134 stores therein the deviation amount and the correction amount that are computed by the computation section 132. The CPU 131 reads the deviation amount or the correction amount from the storage 134 at an appropriate timing.

The controller 104 can calculate a current direction of a line of sight of a user and an optical-axis direction by computing an amount of shift of and an amount of correction for a display-target image. Further, the controller 104 can calculate a shift of a display-target image from an initial reference position in the XY direction, on the basis of a position of a Fourier image of the conjugate light CL in a portion around the pupil 121. Further, the controller 104 can also calculate a shift of the display-target image from the initial reference position in the Z direction, on the basis of a defocusing amount of the Fourier image of the conjugate light CL. Furthermore, the controller 104 can change a size and a division width of the Fourier image for the display-target image by adjusting an initial phase of the display-target image.

(3) Example of Image Display Method (Tracking Method)

Figure 6:
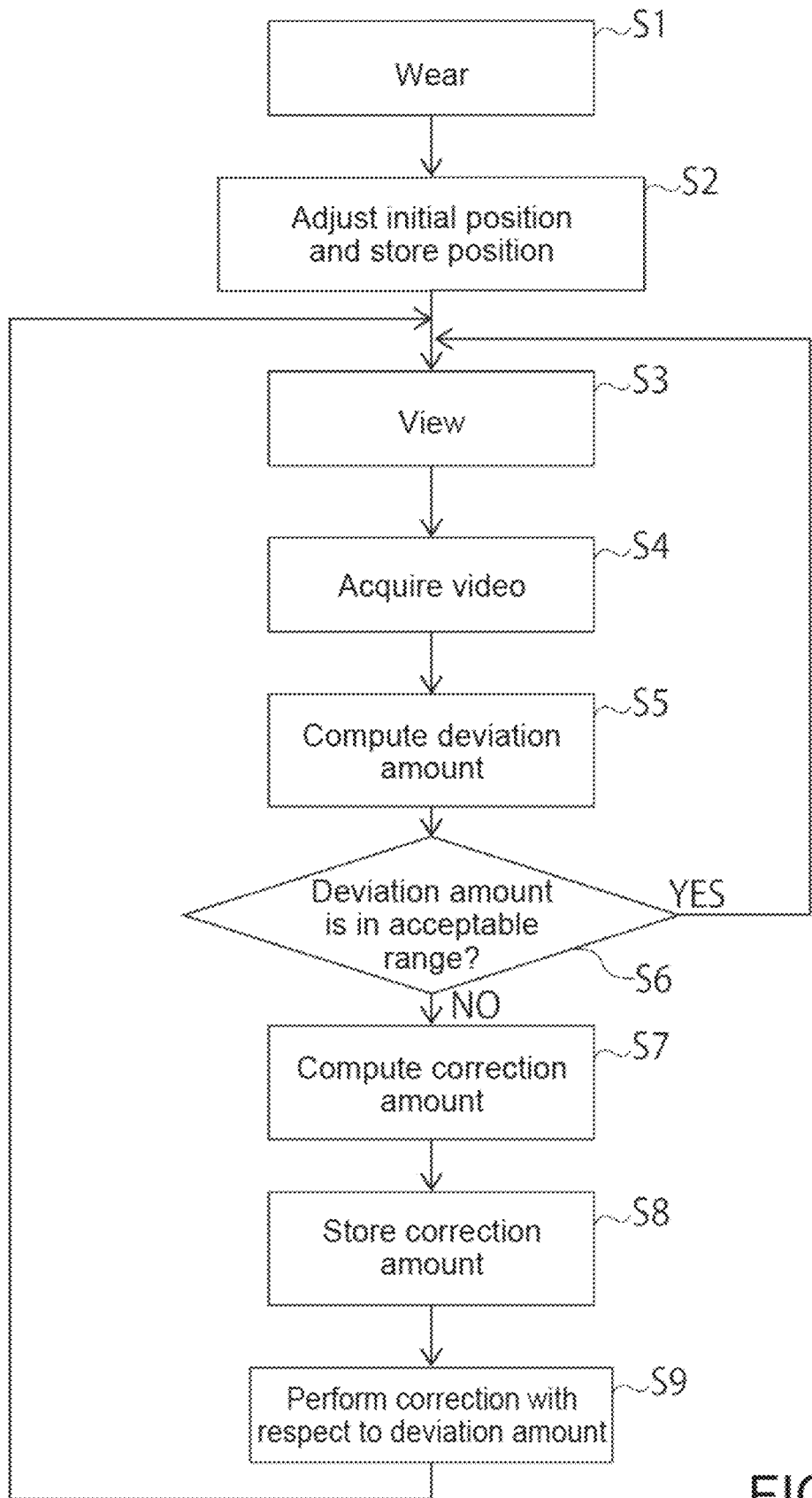
FIG. 6 is a flowchart illustrating an example of an image display method according to the first embodiment of the present technology.

Next, an example of an image display method (tracking method) according to the present embodiment is described with reference to FIG. 6. FIG. 6 is a flowchart illustrating an example of the image display method using the image display apparatus 100.

First, in Step S1, a user wears the image display apparatus 100, which is eyewear. When the image display apparatus 100 is worn, the image display apparatus 100 is turned on.

Next, in Step S2, the controller 104 adjusts an initial reference position of a display-target image to, for example, the center of the pupil 121. When the controller 104 adjusts the initial reference position, the controller 104 stores therein the initial reference position. Thereafter, the optical section 101 emits the image display light OL used to display an image, and the conjugate light CL conjugate to the image display light OL.

In Step S3, the optical section 101 projects the emitted image display light OL and conjugate light CL respectively onto the pupil 121 of an eye of the user and a portion around the pupil 121 of the eye of the user. Then, the user views an image or a video that is displayed on the image display apparatus 100.

In Step S4, a detector detects reflected light that corresponds to the projected conjugate light CL reflected off the portion around the pupil 121. In other words, the imaging section 103 serving as the detector performs image-capturing to acquire an image or a video made up of the conjugate light CL conjugate to the image display light OL.

In Step S5, the controller 104 controls a position of the display-target image on the basis of the detected reflected light. In other words, the computation section 132 of the controller 104 computes a deviation amount for each set frame.

In Step S6, the determination section 133 determines whether the deviation amount d1 is in an acceptable range. When the deviation amount d1 is in the acceptable range (when it is determined to be YES), the process returns to Step S3, and the user continues to view the image or video displayed on the image display apparatus 100. When the deviation amount d1 is not in the acceptable range (when it is determined to be NO), the process moves on to Step S7.

In Step S7, the computation section 132 computes a correction amount (a shift value) on the basis of the deviation amount d1, and performs correction on a position at which the image display light OL is incident.

In Step S8, the storage (memory) 134 stores therein the correction amount computed by the computation section 132, and the process moves on to Step S9.

In Step S9, the CPU 131 causes an image obtained by correction performed using the correction amount to be displayed on the image display apparatus 100. The process returns to Step S3, and the user is caused to view the image or video obtained by the correction.

The image display apparatus 100 according to the present embodiment makes it possible to certainly irradiate the image display light OL onto a location situated away from the image display light OL by a certain amount, since a relationship between the image display light OL and the conjugate light CL is fixed. Thus, a relative position of irradiation light relative to the image display light OL is perfectly secured by physical diffraction conditions, and there is no need to worry about a shift of the relative position.

As described above, the image display apparatus 100 such as a wavefront reconstruction eyewear display using a CGH uses the conjugate light CL being generated at the same time as the image display light OL and emitted at a physically fixed angle. This makes it possible to perform eye tracking accurately and precisely without there being a need for an additional light source or pattern generator for eye tracking. Note that the image display apparatus 100 may also dynamically change a location onto which the image display light OL is irradiated, and the number of times that the image display light OL is irradiated.

Further, in the image display apparatus 100, a distance to the conjugate light CL from the image display light OL and a pattern of the conjugate light CL can be changed by changing an initial phase of a display-target image (reproduced image). This makes it possible to create a high-density pattern of the conjugate light CL, and thus to search for an orientation of a line of sight of an eye using the conjugate light CL appearing near an image while displaying the image using the image display light OL. This results in being able to improve the tracking accuracy.

Further, the image display apparatus 100 can two-dimensionally emit a plurality of pieces of image display light OL, and can detect a translational shift in an XY plane using a change in a pattern of reflection performed on a curved surface of the eyeball 105. Furthermore, using a defocusing amount of the conjugate light CL, the image display apparatus 100 can also detect a depth in the Z direction and detect an amount of an offset upon being worn. Note that sensing can be performed for each specified time period with respect to the amount of an offset upon being worn to update the amount of an offset upon being worn.

As described above, in the image display apparatus 100 such as a wavefront reconstruction display using a CGH, the conjugate light CL is emitted in addition to the image display light OL. Conventionally, the conjugate light CL is considered unnecessary, and thus removed using, for example, a filter or not used. When the conjugate light CL is diverted to eye tracking as an indicator, the conjugate light CL can be used as a very useful reference upon, for example, eye tracking or gaze tracking.

(4) Modifications

Figure 7:
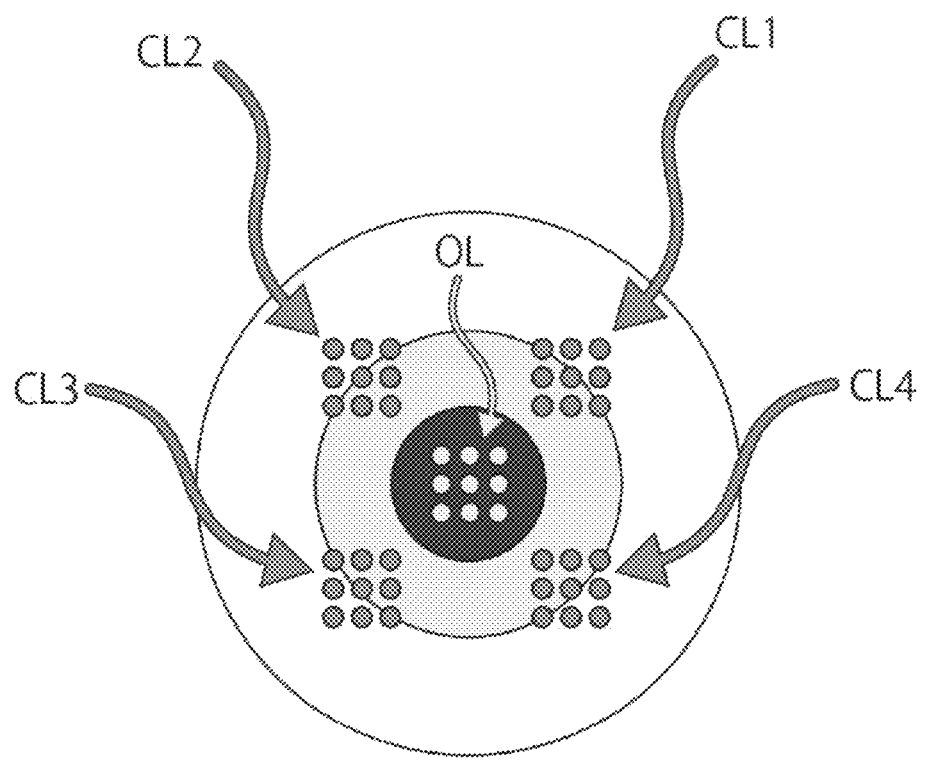
FIG. 7 schematically illustrates an example of a captured image captured using a modification of the image display apparatus according to the first embodiment of the present technology.

Next, a modification of the image display apparatus 100 is described with reference to FIG. 7. FIG. 7 schematically illustrates an example of a captured image captured using the modification of the image display apparatus 100 according to the present embodiment. The modification uses a multiple-order diffractive optical element (DOE) in the combiner 102.

When, for example, a thin DOE that performs diffraction into multiple orders is used as an optical element that is situated on the combiner 102 and off which the conjugate light CL is reflected, this makes it possible to further obtain diffraction patterns of a plurality of pieces of conjugate light CL, as illustrated in FIG. 7. This results in being able to obtain a position of a line of sight or the pupil 121 with a higher degree of accuracy, and thus in being able to improve the eye-tracking accuracy.

2. Second Embodiment

Figure 8:
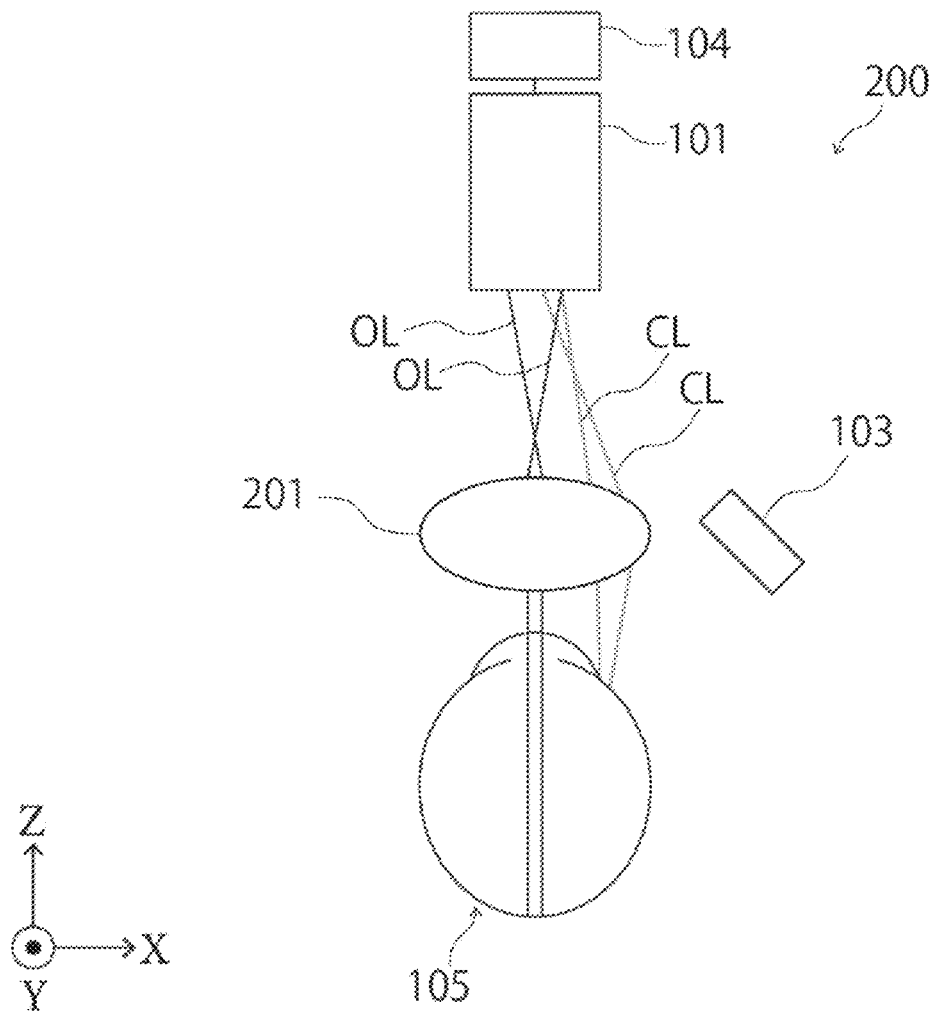
FIG. 8 is a plan view of an image display apparatus according to a second embodiment of the present technology as viewed from above.

Next, an example of a configuration of an image display apparatus according to a second embodiment of the present technology is described with reference to FIG. 8. FIG. 8 is a plan view illustrating an example of a configuration of an image display apparatus 200 according to the present embodiment as viewed from above. The image display apparatus 200 can be applied to a coaxial optical system that deals with, for example, virtual reality (VR).

As illustrated in FIG. 8, the image display apparatus 200 includes the optical section 101, the imaging section 103, and the controller 104, as in the case of the image display apparatus 100 according to the first embodiment. Further, the image display apparatus 200 includes an ocular lens 201. The centers of the optical section 101, the controller 104, and the ocular lens 201 in the image display apparatus 200 are arranged in the same line, and an optical axis extends linearly.

As in the case of the image display apparatus 100 according to the first embodiment, the image display apparatus 200 according to the present embodiment enables even a coaxial optical system to perform eye tracking accurately and precisely without there being a need for an additional light source or pattern generator for eye tracking.

3. Third Embodiment

(1) Example of Configuration of Image Display Apparatus

Figure 9:
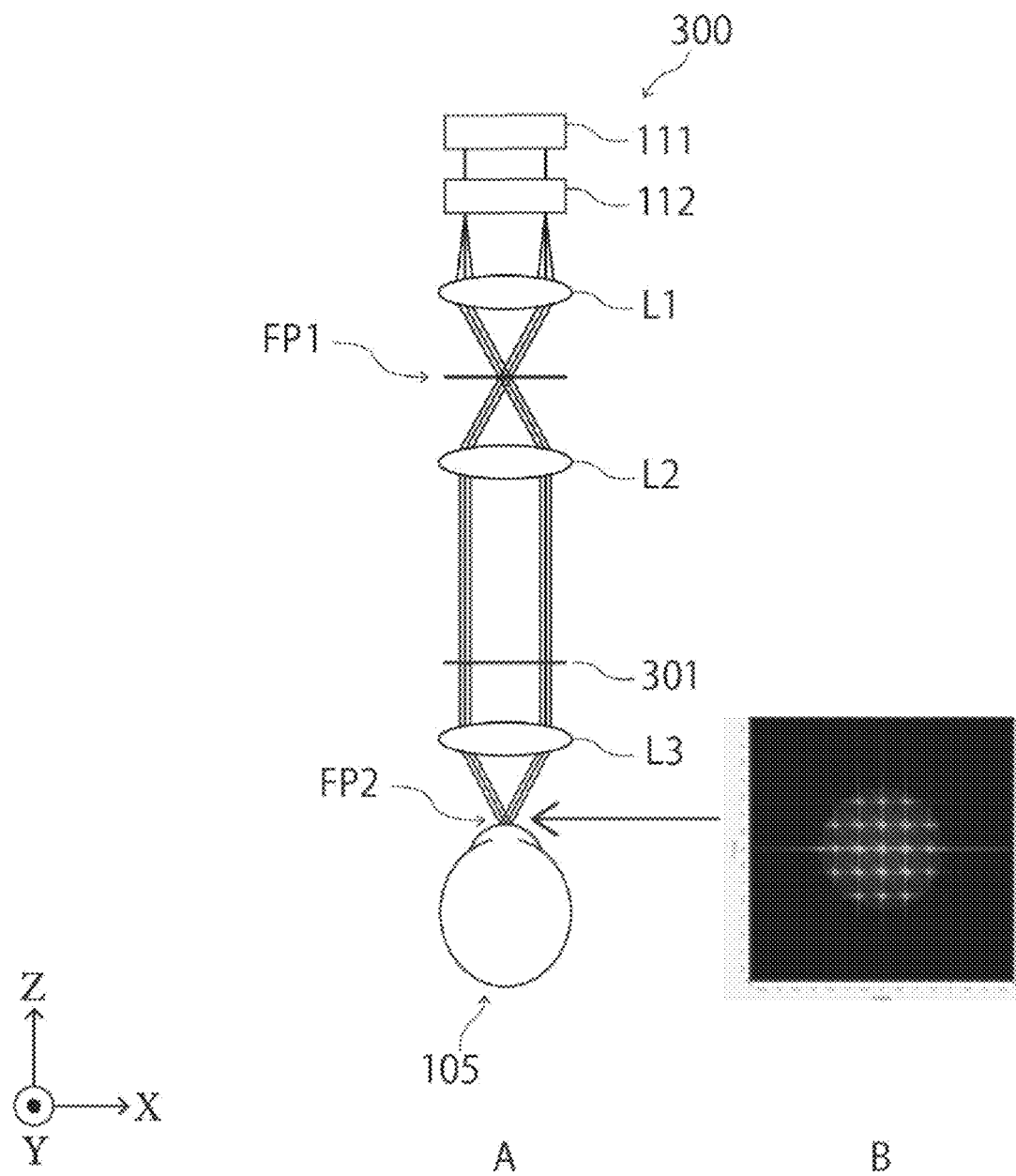
FIG. 9 is a plan view of an image display apparatus according to a third embodiment of the present technology as viewed from above.

Next, an example of a configuration of an image display apparatus according to a third embodiment of the present technology is described with reference to FIG. 9. A of FIG. 9 is a plan view illustrating an example of a configuration of an image display apparatus 300 according to the present embodiment as viewed from above. The image display apparatus 300 makes it possible to divide a pattern on a pupil by adjusting an initial phase.

As illustrated in A of FIG. 9, the image display apparatus 300 includes, for example, the light source section 111, the SLM 112, a lens L1, a lens L2, and an ocular lens L3. Respective structural elements of the image display apparatus 300 are linearly arranged.

The image display light OL emitted by the light source section 111 of the image display apparatus 300 after an initial phase is adjusted, passes through the SLM 112 and the lens L1 to generate a first Fourier plane FP1 between the lens L1 and the lens L2. Thereafter, the image display light OL passes through the lens L2 to form an image plane 301 between the lens L2 and the ocular lens L3. Thereafter, the image display light OL passes through the ocular lens L3 to generate a Fourier plane FP2 in front of the pupil 121 of the eyeball 105.

B of FIG. 9 illustrates a state in which a periodic pattern is added to a display-target image in the second Fourier plane FP2. When a periodic pattern is added to a display-target image, the number of points in the second Fourier plane FP2 in front of the pupil can be increased, as illustrated in B of FIG. 9. This results in making the field of view of the eyeball 105 wider.

(2) Example of Captured Image

Figure 10:
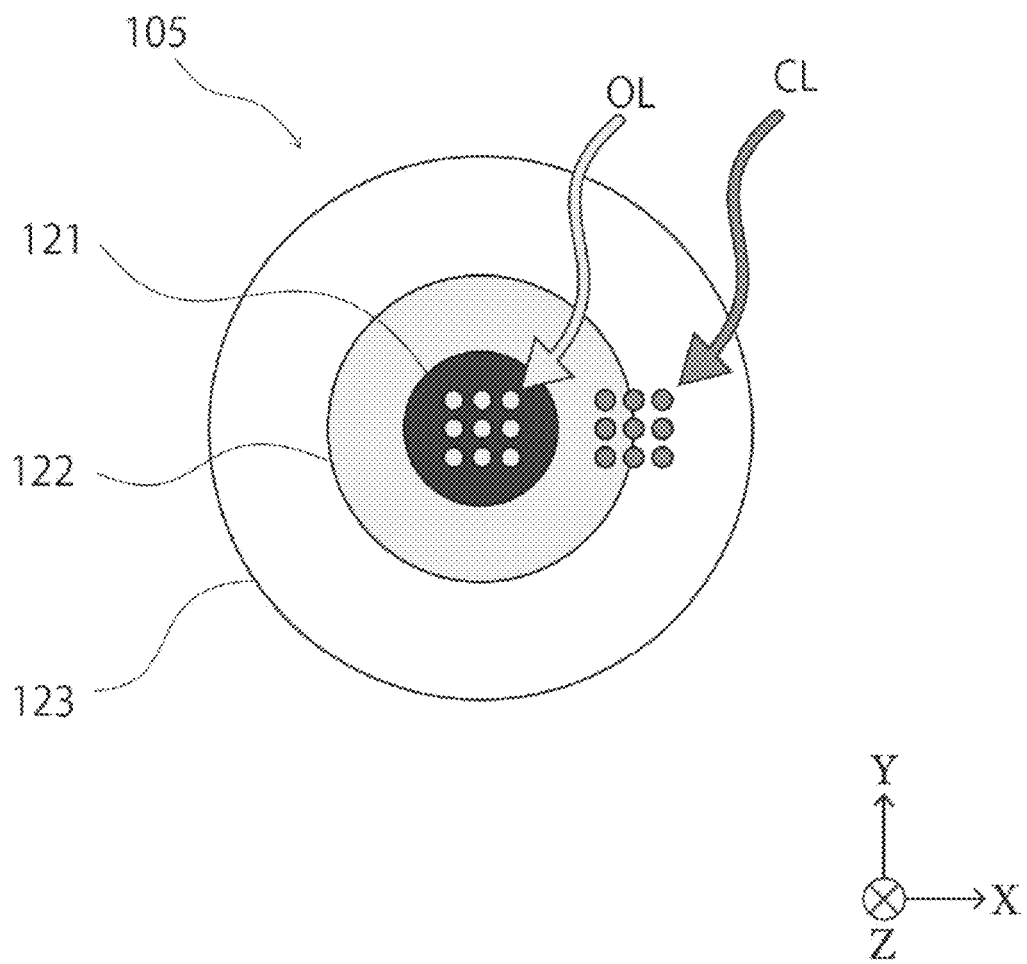
FIG. 10 schematically illustrates an example of a captured image captured using the image display apparatus according to the third embodiment of the present technology.

Next, examples of captured images captured using the image display apparatus 300 are described with reference to FIGS. 10 to 13. FIG. 10 schematically illustrates a captured image of the eyeball 105 that is captured from the front of the eyeball 105 using the image display apparatus 300.

When a periodic pattern is added to a display-target image, the number of points in the second Fourier plane FP2 in front of the pupil is increased, as illustrated in FIG. 10. Consequently, the image display light OL irradiated onto the pupil 121 is irradiated not only in the form of a single point but also in the form of a plurality of points in a specified narrow range. Then, the conjugate light CL irradiated onto a portion, on the iris 122 and the sclera 123, that is situated around the pupil 121 is also irradiated in the form of a plurality of points, as in the case of the image display light OL. This results in being able to easily determine an amount of tracking deviation. Note that tracking can be performed with a higher degree of accuracy if the number of the plurality of points is larger and the point pitch is smaller.

Thus, when the deviation amount is desired to be accurately detected, the image display apparatus 300 adjusts a phase of an original image at the time of calculating a CGH, and this makes it possible to change a size or a division width of an image to be displayed on the pupil 121, that is, a Fourier image to be generated in front of the pupil 121. For example, a Fourier image with a larger number of divisions can be generated, and the insertion of it into an arbitrary frame makes it possible to increase a degree of accuracy in detection. This is useful in estimating not only a position of the pupil 121 but also a more detailed amount of rotation of the eyeball 105 when eye tracking is performed.

Figure 11:
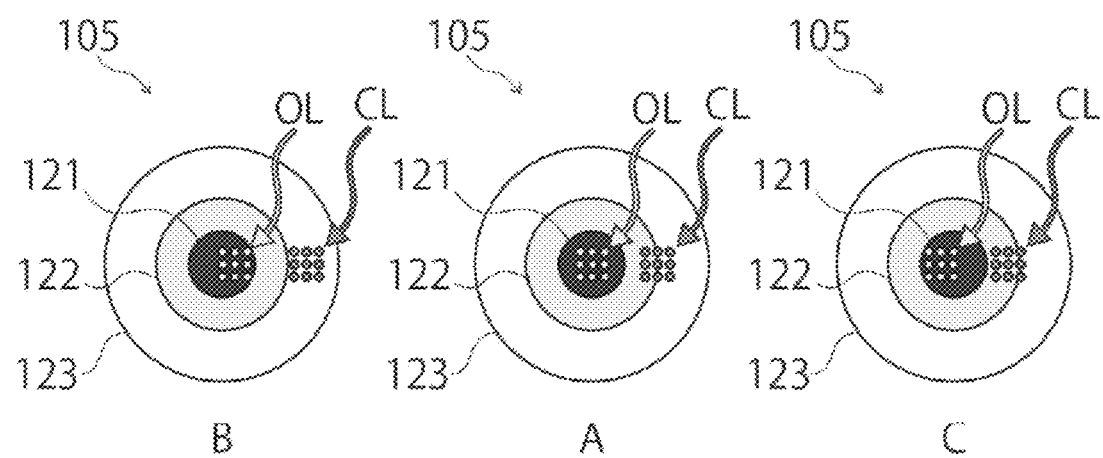
FIG. 11 schematically illustrates another example of a captured image captured using the image display apparatus according to the third embodiment of the present technology.

Next, detection of a shift of a captured image of the eyeball 105 that is captured from the front of the eyeball 105 using the image display apparatus 300 is described with reference to FIGS. 11 to 13. FIG. 11 is a schematic diagram used to describe detection of a translational shift of the captured image of the eyeball 105 in the XY plane, the captured image of the eyeball 105 being captured from the front of the eyeball 105 using the image display apparatus 300. A of FIG. 11 schematically illustrates a reference state in which the image display light OL is irradiated onto the center of the pupil 121 without deviation. B of FIG. 11 schematically illustrates a state in which the image display light OL deviating rightward as viewed from the surface of the sheet of the figure is irradiated onto the pupil 121. C of FIG. 11 schematically illustrates a state in which the image display light OL deviating leftward as viewed from the surface of the sheet of the figure is irradiated onto the pupil 121.

When the conjugate light CL corresponding to a plurality of points in the captured image deviates in the XY direction from an initial reference position beyond an acceptable range, as in B or C of FIG. 11, an amount of shift of the captured image can be obtained by observing a position of a Fourier image of the conjugate light CL on the eyeball 105 using the image display apparatus 300, and by computing the shift from the initial reference position.

Figure 12:
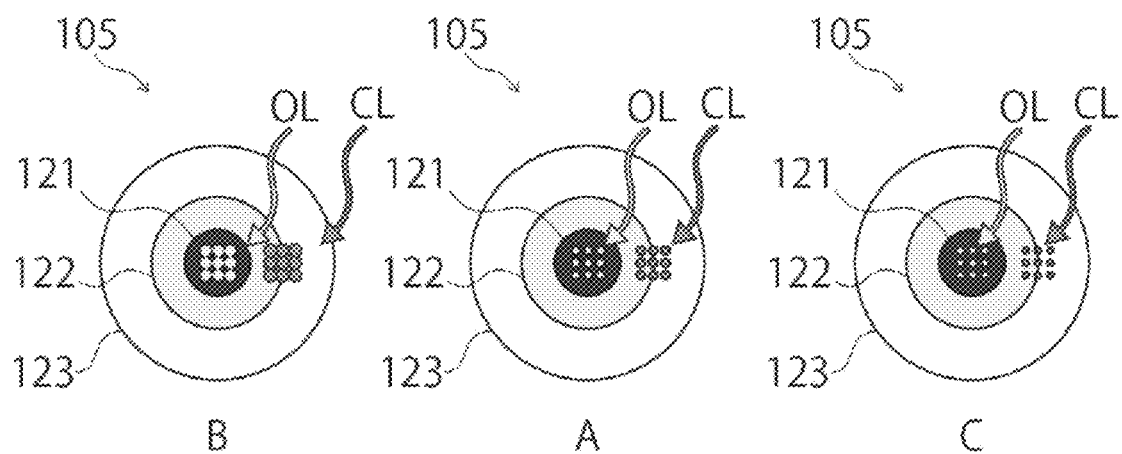
FIG. 12 schematically illustrates yet another example of a captured image captured using the image display apparatus according to the third embodiment of the present technology.

FIG. 12 is a schematic diagram used to describe detection of a depth shift of the captured image of the eyeball 105 in the Z direction, the captured image of the eyeball 105 being captured from the front of the eyeball 105 using the image display apparatus 300. A of FIG. 12 schematically illustrates a reference state in which the image display light OL is irradiated onto the center of the pupil 121 without defocusing. B of FIG. 12 schematically illustrates a state in which the image display light OL is irradiated to be focused on a position further away from the eyeball 105 than the initial reference position. C of FIG. 12 schematically illustrates a state in which the image display light OL is irradiated to be focused on a position closer to the eyeball 105 than the initial reference position.

When the conjugate light CL corresponding to a plurality of points in the captured image is defocused on a position offset from an initial reference position in the Z direction beyond an acceptable range, as in B or C of FIG. 12, an amount of shift of the captured image can be determined using a defocusing amount of a Fourier image of the conjugate light CL.

Figure 13:
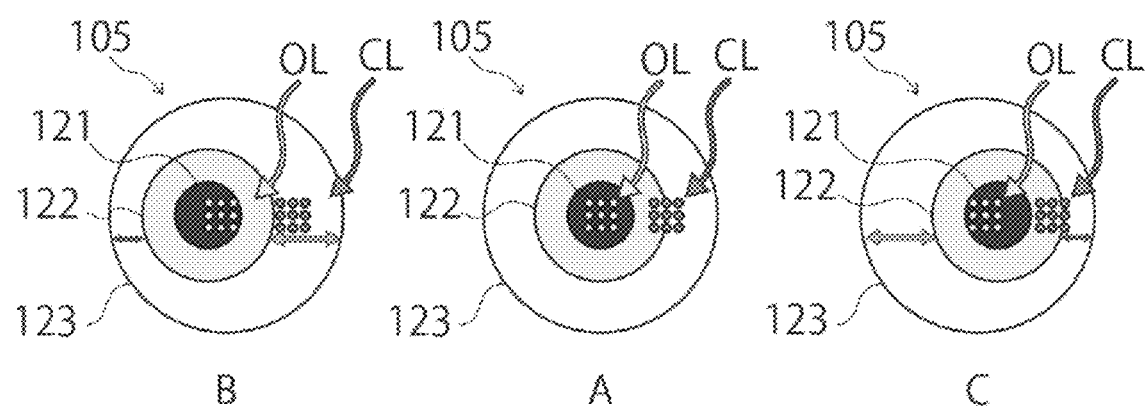
FIG. 13 schematically illustrates yet another example of a captured image captured using the image display apparatus according to the third embodiment of the present technology.

FIG. 13 is a schematic diagram used to describe detection of a rotational deviation upon rotating an orientation of the pupil 121 rightward or leftward from the initial reference position by a rotation angle θ in a plane when the eyeball 105 is viewed from overhead. A of FIG. 13 schematically illustrates a reference state in which the image display light OL is irradiated onto the center of the pupil 121 without a rotational deviation. B of FIG. 13 schematically illustrates a state in which the image display light OL is irradiated onto the pupil 121 when the pupil 121 is rotated leftward from the incident image display light OL. C of FIG. 13 schematically illustrates a state in which the image display light OL is irradiated onto the pupil 121 when the pupil 121 is rotated rightward from the incident image display light OL.

When the conjugate light CL corresponding to a plurality of points in the captured image deviates in a rotation direction from an initial reference position beyond an acceptable range, as in B or C of FIG. 13, an amount of shift of the captured image can be obtained by observing a position of a Fourier image of the conjugate light CL on the eyeball 105 using the image display apparatus 300, and by computing the shift from the initial reference position. Further, when the conjugate light CL deviates in the rotation direction, the shift from the initial reference position can also be determined by observing asymmetry in width between a right portion and a left portion in a portion situated between the iris 122 and the sclera 123, as illustrated in B or C of FIG. 13.

In the image display apparatus 300 according to the present embodiment, a distance to the conjugate light CL from the image display light OL and a pattern of the conjugate light CL are changed by changing an initial phase of a display-target image, and the conjugate light CL corresponding to a plurality of points in a specified narrow range is observed. This makes it possible to further improve the tracking accuracy, compared to when the image display apparatus 100 according to the first embodiment is used. Further, the image display apparatus 300 can obtain a position of a line of sight or the pupil 121 with a higher degree of accuracy.

Further, using a defocusing amount of the conjugate light CL, the image display apparatus 300 can detect not only a translational shift in the XY plane but also the Z direction (depth) and detect an amount of an offset upon being worn. Note that sensing can be performed for each specified time period with respect to the amount of an offset upon being worn to update the amount of an offset upon being worn.

4. Fourth Embodiment

Figure 14:
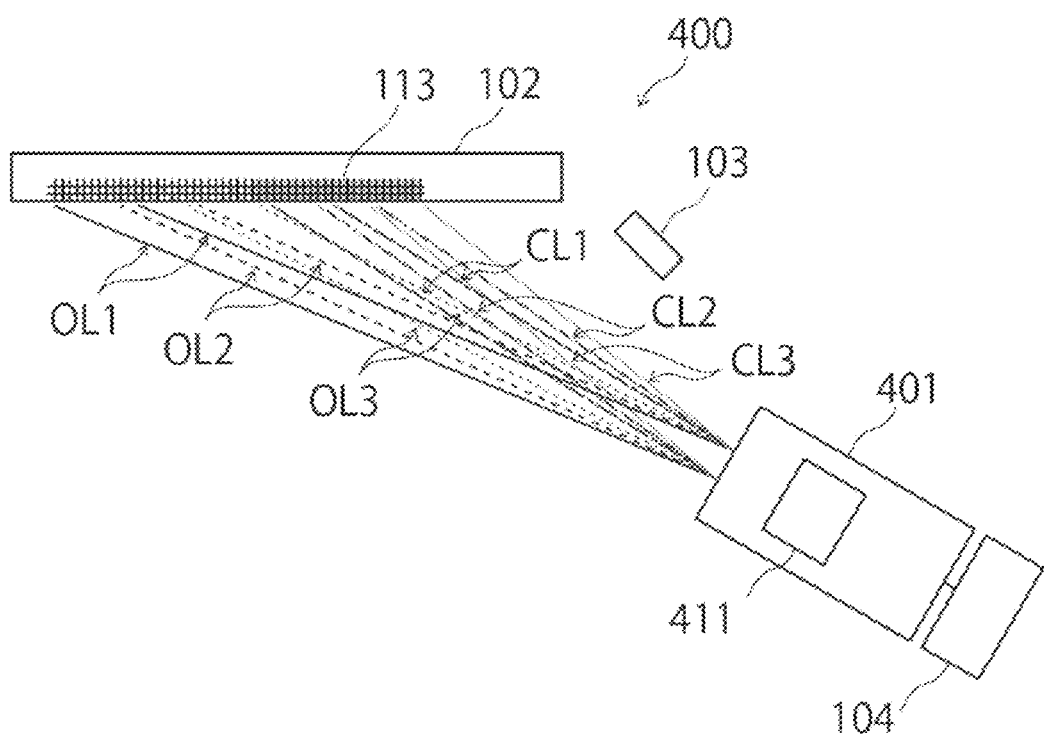
FIG. 14 is a plan view of an image display apparatus according to a fourth embodiment of the present technology as viewed from above.

Next, an example of a configuration of an image display apparatus according to a fourth embodiment of the present technology is described with reference to FIG. 14. FIG. 14 is a plan view illustrating an example of a configuration of an image display apparatus 400 according to the present embodiment as viewed from above. The image display apparatus 400 includes, in an optical section, a device for shifting or splitting a light beam.

As illustrated in FIG. 14, the image display apparatus 400 includes an optical section 401, the combiner 102, the imaging section 103, and the controller 104, as in the case of the image display apparatus 100 according to the first embodiment. In the image display apparatus 400, the optical section 401 and the combiner 102 form an optical system.

As in the case of the image display apparatus 100, the optical section 401 includes the light source section 111 and the SLM, although this is not illustrated. Further, for example, the optical section 401 includes, in a Fourier plane, a device 411 for shifting and/or splitting a light beam.

When the image display apparatus 400 includes, in the optical section 401, the device 411 for shifting and/or splitting a light beam, this makes it possible to, for example, shift image display light emitted by the optical section 401 to pieces of image display light OL1, OL2, and OL3, and to, for example, shift light conjugate to the image display light to pieces of conjugate light CL1, CL2, and CL3.

In the image display apparatus 400 according to the present embodiment, a Fourier image is amplified by splitting the conjugate light CL emitted by the optical section 401, and the conjugate light CL corresponding to a plurality of points is observed. This makes it possible to further improve the tracking accuracy, compared to when the image display apparatus 100 according to the first embodiment is used. Further, the image display apparatus 400 can also track the pupil 121 when the pupil 121 is dilated.

5. Fifth Embodiment

Figure 15:
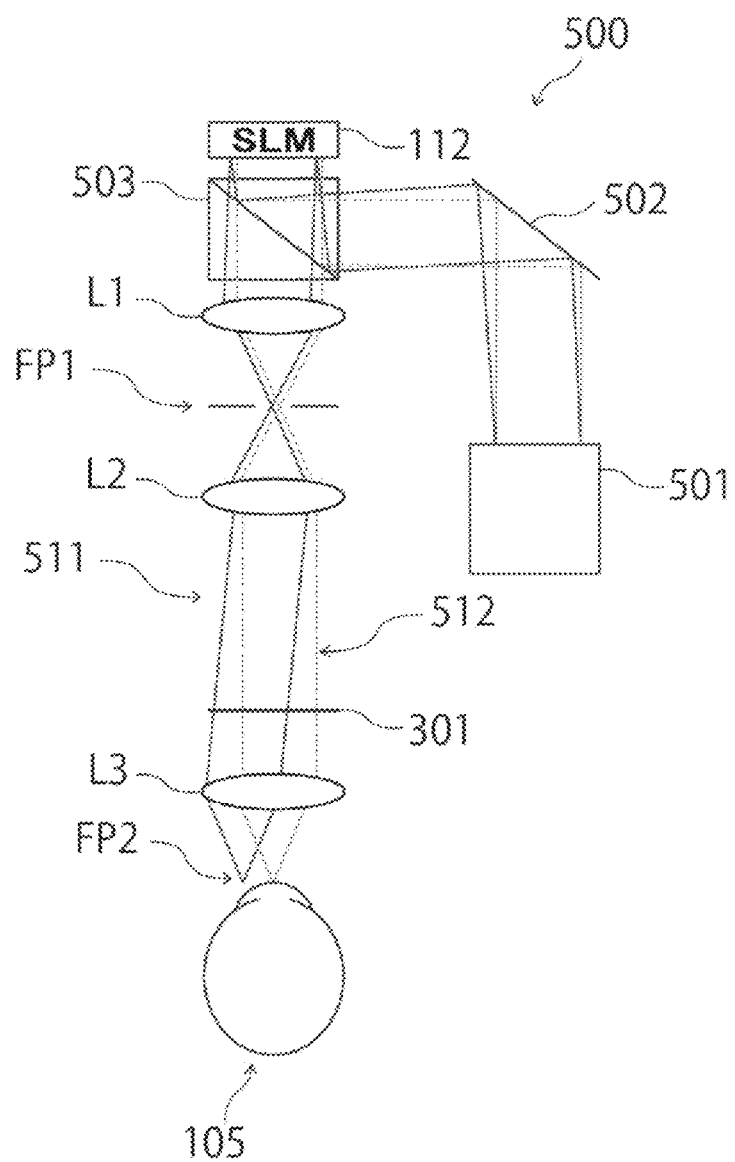
FIG. 15 is a plan view of an image display apparatus according to a fifth embodiment of the present technology as viewed from above.

Next, an example of a configuration of an image display apparatus according to a fifth embodiment of the present technology is described with reference to FIG. 15. FIG. 15 is a plan view illustrating an example of a configuration of an image display apparatus 500 according to the present embodiment as viewed from above. In the image display apparatus 500, a light source section uses a plurality of light sources to perform eye tracking.

As illustrated in FIG. 15, the image display apparatus 500 includes, for example, an optical section 501 that includes a light source section that emits a light ray 511 from a light source 1 and a light ray 512 from a light source 2, a reflecting mirror 502, a prism 503, the SLM 112, the lens L1, the lens L2, and the ocular lens L3.

The light ray 511 from the light source 1 and the light ray 512 from the light source 2 that are emitted by the light source section included in the optical section 501 after an initial phase is adjusted, is reflected off the reflecting mirror 502 to be headed for the prism 503. The reflected light ray 511 from the light source 1 and the reflected light ray 512 from the light source 2 are reflected within the prism 503 to be headed for the SLM 112. The reflected light rays 511 and 512 return to the prism 503 from the SLM 112 to pass through the prism 503 again, and are headed for the lenses. The light ray 511 from the light source 1 and the light ray 512 from the light source 2 pass through the lens L1 to generate a first Fourier plane FP1 between the lens L1 and the lens L2. Thereafter, the image display light OL passes through the lens L2 to form the image plane 301 between the lens L2 and the ocular lens L3. Thereafter, the image display light OL passes through the ocular lens L3 to generate a Fourier plane FP2 in front of the pupil 121 of the eyeball 105.

In the image display apparatus 500 according to the present embodiment, for example, image display light is shifted to the light ray 511 from the light source 1 and the light ray 512 from the light source 2 using a plurality of light sources, and pieces of light conjugate to the light rays 511 and 512 are also shifted. Consequently, a Fourier image is amplified, and the conjugate light CL corresponding to a plurality of points is observed. Thus, the image display apparatus 500 makes it possible to further improve the tracking accuracy, compared to when the image display apparatus 100 according to the first embodiment is used, and to also track the pupil 121 when the pupil 121 is dilated.

6. Sixth Embodiment

Figure 16:
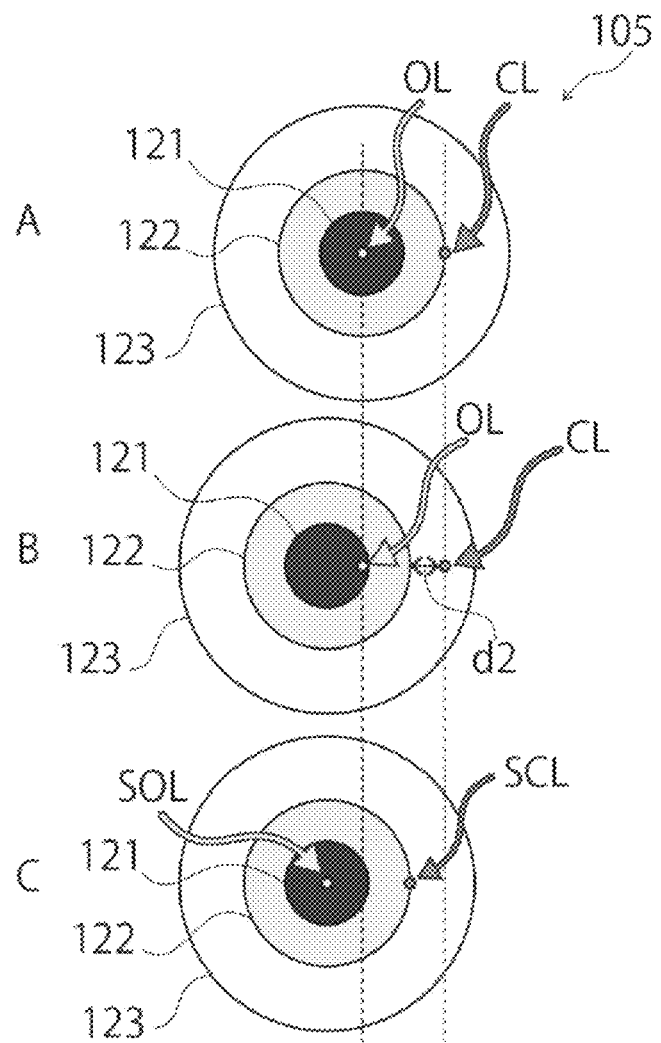
FIG. 16 schematically illustrates an example of a captured image captured using an image display apparatus according to a sixth embodiment of the present technology.

Next, an example of eye tracking performed using an image display apparatus according to a sixth embodiment of the present technology is described with reference to FIG. 16. FIG. 16 schematically illustrates an example of a captured image captured using an image display apparatus according to the present technology. In the present embodiment, an optical system adds an emission pattern of an initial reference position to a portion of frames, and measures a current deviation amount with respect to a display-target image to perform periodical calibration.

A of FIG. 16 schematically illustrates a reference state in which the image display light OL is irradiated onto the center of the pupil 121 (an initial reference position) without the image display apparatus being worn with an offset. B of FIG. 16 schematically illustrates a state in which the image display apparatus is worn with an offset and the image display light OL deviating rightward as viewed from the surface of the sheet of the figure is irradiated onto the pupil 121. C of FIG. 16 schematically illustrates a state in which correction is performed on an offset amount with respect to the state of the image display apparatus being worn with an offset, and image display light SOL to which the image display light OL has been shifted is irradiated onto the center of the pupil 121.

As illustrated in A and B of FIG. 16, an emission pattern of an initial reference position is emitted only for an instant to add the emission pattern to a portion of frames, and a current deviation amount d2 with respect to a display-target image to perform periodical calibration. A correction amount is computed on the basis of the measured deviation amount d2, and image display light SOL to which the image display light OL has been shifted is moved to be irradiated onto the center of the pupil 121.

As described above, an accumulated error is made small in the present embodiment, and this makes it possible to improve the eye-tracking accuracy. Note that it is favorable that, in the case of the present embodiment, eye tracking be performed using a combination of the image display light OL, which is not irradiated onto the pupil 121, and the conjugate light CL conjugate to the non-irradiated image display light OL.

7. Other Use Applications

The example in which the image display apparatus is applied to a single eye has been described in the embodiments above. However, the image display apparatus according to the present technology is not limited to being applied to a single eye, and may be applied to two eyes. When the image display apparatus according to the present technology is applied to two eyes, this makes it possible to obtain a position of a line of sight or a pupil with a higher degree of accuracy using data of the two eyes. This results in being able to estimate an amount of rotation of an eyeball, a gaze point and thus convergence, and an adjustment amount with a higher degree of accuracy.

Note that the present technology may take the following configurations.

(1) An image display apparatus, including:
　a light source section that emits image display light used to display an image, and light conjugate to the image display light;
　an optical system that projects the image display light emitted by the light source section onto a pupil of an eye of a user, and projects the conjugate light emitted by the light source section onto a portion around the pupil of the eye of the user;
　a detector that detects reflected light that corresponds to the conjugate light projected by the optical system to be reflected off the portion around the pupil; and
　a controller that controls a position of a display-target image on the basis of the reflected light detected by the detector.

(2) The image display apparatus according to (1), in which the optical system includes
　a light concentration section that changes directions of the image display light and the conjugate light, and concentrates the image display light and the conjugate light on the eye of the user, and
　a modulator that spatially modulates amplitudes or phases of the image display light and the conjugate light.

(3) The image display apparatus according to (1) or (2), in which
　the detector includes an imaging section that captures an image-formation image in which the image display light is incident on the pupil to be imaged onto a retina, and a reflection image in which the conjugate light is reflected off the portion around the pupil, and
　on the basis of the image-formation image and the reflection image that are captured by the imaging section, the controller computes an amount of shift of and an amount of correction for the display-target image.

(4) The image display apparatus according to (3), in which the controller calculates a current direction of a line of sight of the user and an optical-axis direction by computing the amount of shift of and the amount of correction for the display-target image.

(5) The image display apparatus according to any one of (1) to (4), in which
the portion around the pupil is one of an iris, a sclera, a boundary of the pupil and the iris, and a boundary of the iris and the sclera.
(6) The image display apparatus according to any one of (1) to (5), in which
on the basis of a position of a Fourier image of the conjugate light in the portion around the pupil, the controller calculates a shift of the display-target image from an initial position in a plane vertical to a direction of a line of sight of the eye.
(7) The image display apparatus according to any one of (1) to (6), in which
on the basis of a defocusing amount of a Fourier image of the conjugate light, the controller calculates a shift of the display-target image from an initial position in a direction of a line of sight of the eye.
(8) The image display apparatus according to any one of (1) to (7), in which
the controller changes a size and a division width of a Fourier image for the display-target image by adjusting an initial phase of the display-target image.
(9) The image display apparatus according to any one of (1) to (8), in which
the optical system is a coaxial optical system.
(10) The image display apparatus according to any one of (1) to (9), in which
the detector acquires information regarding the image display light and the conjugate light from two eyes.
(11) The image display apparatus according to (2), in which
the light concentration section uses a diffractive optical element as an optical element off which the conjugate light is reflected.
(12) The image display apparatus according to any one of (1) to (11), in which
the optical system includes, in a Fourier plane, a device for shifting and/or splitting a light beam.
(13) The image display apparatus according to any one of (1) to (12), in which
the light source section uses a plurality of light sources.
(14) The image display apparatus according to any one of (1) to (13), in which
the optical system adds an emission pattern of an initial position to a portion of frames, and measures an amount of shift of the display-target image to perform periodical calibration.
(15) An image display method, including:
emitting image display light used to display an image, and light conjugate to the image display light;
projecting the emitted image display light and the emitted conjugate light respectively onto a pupil of an eye of a user and a portion around the pupil of the eye of the user;
detecting reflected light that corresponds to the projected conjugate light reflected off the portion around the pupil; and
controlling a position of a display-target image on the basis of the detected reflected light.

REFERENCE SIGNS LIST 100, 200, 300, 400, 500 image display apparatus
101, 401, 501 optical section
102 combiner (light concentration section)
103 imaging section
104 controller
105 eyeball (right eye)
111 light source section
112 SLM
121 pupil
122 iris
123 sclera
131 CPU
132 computation section
133 determination section
134 storage
201 ocular lens
301 image plane
411 device for shifting and/or splitting light beam
502 reflecting mirror
503 prism
511 light ray from light source 1
512 light ray from light source 2
OL, OL1 to OL3, SOL image display light (object light)
CL, CL1 to CL4, SCL conjugate light
d1, d2 deviation amount
L1 to L3 lens
FP1, FP2 Fourier plane

The invention claimed is:

1. An image display apparatus, comprising:
a light source that simultaneously emits image display light used to display an image and conjugate light conjugate to the image display light;
an optical system that projects the image display light emitted by the light source onto a pupil of an eye of a user, and that projects the conjugate light emitted by the light source onto a portion around the pupil of the eye of the user;
a detector that detects reflected light that corresponds to the conjugate light projected by the optical system and reflected off the portion around the pupil; and
a controller that controls a position of a display-target image on a basis of the reflected light detected by the detector.

2. The image display apparatus according to claim 1, wherein the optical system includes:
a light concentration section that changes directions of the image display light and the conjugate light, and concentrates the image display light and the conjugate light on the eye of the user; and
a modulator that spatially modulates amplitudes or phases of the image display light and the conjugate light.

3. The image display apparatus according to claim 1, wherein:
the detector includes an imaging section that captures an image-formation image in which the image display light is incident on the pupil and imaged onto a retina, and a reflection image in which the conjugate light is reflected off the portion around the pupil; and
on a basis of the image-formation image and the reflection image that are captured by the imaging section, the controller computes an amount of shift of and an amount of correction for the display-target image.

4. The image display apparatus according to claim 3, wherein the controller calculates a current direction of a line of sight of the user and an optical-axis direction by computing the amount of shift of and the amount of correction for the display-target image.

5. The image display apparatus according to claim 1, wherein the portion around the pupil is one of an iris, a sclera, a boundary of the pupil and the iris, and a boundary of the iris and the sclera.

6. The image display apparatus according to claim 1, wherein on a basis of a position of a Fourier image of the conjugate light in the portion around the pupil, the controller calculates a shift of the display-target image from an initial position in a plane vertical to a direction of a line of sight of the eye.

7. The image display apparatus according to claim 1, wherein on a basis of a defocusing amount of a Fourier image of the conjugate light, the controller calculates a shift of the display-target image from an initial position in a direction of a line of sight of the eye.

8. The image display apparatus according to claim 1, wherein the controller changes a size and a division width of a Fourier image for the display-target image by adjusting an initial phase of the display-target image.

9. The image display apparatus according to claim 1, wherein the optical system is a coaxial optical system.

10. The image display apparatus according to claim 1, wherein the detector acquires information regarding the image display light and the conjugate light from two eyes.

11. The image display apparatus according to claim 2, wherein the light concentration section uses a diffractive optical element as an optical element that reflects the conjugate light.

12. The image display apparatus according to claim 1, wherein the optical system includes, in a Fourier plane, a device for shifting and/or splitting a light beam.

13. The image display apparatus according to claim 1, wherein the light source comprises a plurality of light sources.

14. The image display apparatus according to claim 1, wherein the optical system adds an emission pattern of an initial position to a portion of frames, and measures an amount of shift of the display-target image to perform periodical calibration.

15. An image display method, comprising:
simultaneously emitting image display light used to display an image, and conjugate light conjugate to the image display light;
projecting the emitted image display light onto a pupil of an eye of a user and projecting the emitted conjugate light onto a portion around the pupil of the eye of the user;
detecting reflected light that corresponds to the projected conjugate light reflected off the portion around the pupil; and
controlling a position of a display-target image on a basis of the detected reflected light.

* * * * *